VERTICAL RETRACE BLANKING

Filed Nov. 8, 1949

INVENTOR
GARTH J. HEISIG

BY Forman L. Mueller

ATTYS.

Patented Aug. 19, 1952

2,607,847

UNITED STATES PATENT OFFICE 2,607,847

VERTICAL RETRACE BLANKING

Garth J. Heisig, Chicago, Ill., assignor to Motorola, Inc., Chicago, Ill., a corporation of Illinois Application November 8, 1949, Serial No. 126,105

2 Claims. (Cl. 178—7.5)

This invention relates to television receivers, and particularly to the blanking or suppression of vertical retrace lines on the picture tubes of such receivers.

Vertical retrace lines are slanting luminous lines which appear on the screen of the picture tube in rather widely spaced relationship if the tracing beam is not suppressed during its vertical return movements. Actually they consist of horizontal line traces which are slanted and spread apart due to the rapid return of the beam vertically. The video signals which are broadcast by television stations contain vertical blanking pulses for suppressing these vertical retrace lines to some extent. However, when transmitting certain scenes and when using certain modulation levels, the blanking pulses of the video signal may not be sufficient to completely suppress the lines produced by the vertical retrace. Such a condition is, of course, very annoying to those viewing the picture, and to prevent this from occurring, it is desirable that the receiver itself should include some provisions for insuring that the vertical retrace lines are effectively blanked.

An object of the present invention, therefore, is to provide improved means in a televison receiver for preventing the appearance of vertical retrace lines on the viewing screen thereof.

Another object is to generate blanking pulses within the receiver and to apply such pulses to the picture tube in synchronism with the vertical return movements of the tracing beam, thereby blanking the vertical retrace lines in the event that the vertical blanking pulses in the received video signal are not sufficiently strong for that purpose.

Still another object is to utilize a voltage from the vertical sweep system in a television receiver for blanking the picture tube screen during the vertical retrace periods.

A feature of the invention is the provision of a vertical sweep system including an RC (resistance-capacitance) wave shaping circuit, in which the resistance portion has a peaking effect. A voltage wave is thereby developed across the resistance portion including a series of blanking pulses that are synchronized with the vertical return movements of the tracing beam. These blanking pulses are applied to the picture tube in such fashion as to suppress the appearance of vertical retrace lines on the viewing screen.

A subsidiary feature is the provision of an RC voltage divider as described above, wherein the peaking resistor has one end thereof connected to ground and the other end thereof connected to a control grid in the picture tube, with the cathode of said tube being biased relative to ground potential and receiving the pitcure signals from the video amplifier. The negative blanking pulses developed in the peaking resistor directly affect the control grid potential in the picture tube for the suppression of vertical retrace lines.

The foregoing and other objects and features of the invention will be understood better from a study of the following description thereof taken in connection with the accompanying drawing, wherein.

In practicing the invention, an RC voltage divider having a peaking resistor therein is embodied in the vertical sweep system of a television receiver to derive periodic blanking pulses from a sawtooth (or approximately sawtooth) voltage wave at vertical sweep frequency. In the case of an electromagnetic system, the peaking resistor may already be included within the system for other purposes. In the case of an electrostatic system, it may be necessary to add an RC circuit for peaking or differentiating the sawtooth wave to carry out the objectives of this invention. In either event, the peaking of the sawtooth voltage wave generated within the vertical sweep system furnishes blanking pulses in synchronism with the vertical return movements of the tracing beam in the picture tube, these blanking pulses appearing across the resistor in the RC circuit. Preferably the picture signals are applied to the picture tube by cathode injection, with the cathode of the picture tube being biased relative to ground. The control grid of the picture tube is connected to one end of the peaking resistor, and the other end of this resistor is grounded. This provides a convenient, simple system for periodically biasing the control grid negatively to suppress vertical retrace lines on the screen of the picture tube.

Figures 1, 2:
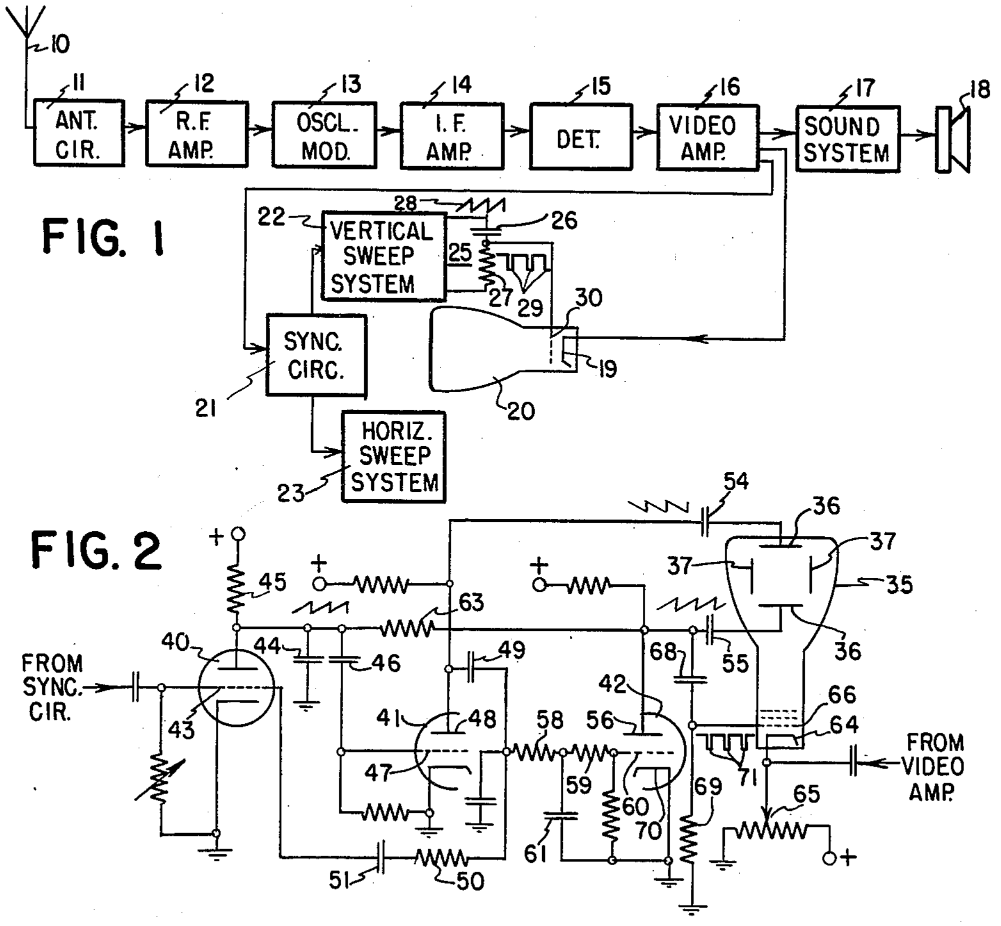
Fig. 1 is a block diagram of a television receiver in which the present invention is embodied.
Fig. 2 is a schematic view showing the invention as applied to a vertical sweep system for a picture tube of the electrostatic type.

Referring now to Fig. 1, the invention is shown embodied in a television receiver of the intercarrier sound type. Signals picked up by the antenna 10 pass through a tuned antenna circuit 11 to a tuned radio frequency amplifier 12. The amplified radio frequency signals are mixed with local oscillations in an oscillator-modulator 13, which converts the radio frequency signal to an intermediate frequency signal that is amplified in the intermediate frequency amplifier 14. The amplified intermediate frequency signal then is detected in the second detector 15. The output of the detector 15, containing both sound and video components, is fed to a video amplifier 16. The output of the video amplifier 16 is separated into the sound component, a video synchronization component and a picture component. The sound signals are amplified in a sound system 17, and are fed to a sound reproducer such as the loudspeaker 18. The picture signals in the illustrated system, are fed to the cathode 19 of the picture tube 20. The video synchronization signals pass to a synchronization circuit 21 having suitable clippers and associated devices for extracting the vertical and horizontal synchronizing pulses from the video signal. These synchronizing pulses are applied respectively to a vertical sweep circuit 22 and to a horizontal sweep circuit 23 that respectively operate the vertical and horizontal deflectors (not shown in Fig. 1) of the picture tube 20.

The present invention is concerned more particularly with the vertical sweep system 22 of the receiver, and it contemplates the provision of an RC voltage divider or peaking circuit 25 in the vertical sweep system 22. In some sweep systems this peaking circuit may already exist for other purposes, and in others it will have to be specially provided. The peaking circuit 25 includes a capacitor 26 in series with a resistor 27. A sawtooth (or approximately sawtooth) voltage wave 28 generated by the vertical sweep system 22 appears across the series combination of the capacitor 26 and the resistor 27. Short negative voltage pulses 29 are developed in the resistor 27 during the vertical blanking intervals in the received video signal. If the vertical blanking pulses in the video signal are not sufficiently strong to suppress the vertical retrace lines on the screen of the picture tube 20, the negative pulses 29 produced by the peaking circuit 25 may be employed to suppress the vertical retrace lines. This is accomplished by applying the pulses 29 to a control grid 30 in the picture tube 20 for decreasing the intensity of the tracing beam during the vertical return periods. As a result, the objectionable vertical lines are suppressed in the picture tube 20.

In Fig. 2 there is shown schematically a vertical sweep system for a picture tube 35 of the electrostatic type having vertical deflecting plates 36 and horizontal deflecting plates 37. A sweep system of this character is disclosed in United States Letters Patent 2,458,367 issued on January 4, 1949, to George W. Fyler and Garth J. Heisig. In this type of sweep system the triode 40 functions as a switch tube and also as one of the tubes in a multivibrator that includes a triode 41 as the other tube thereof. The triode 41 and another triode 42, which may be contained in the same envelope as the triode 41, operate in push-pull as output tubes for the system.

The purpose of arranging the tubes 40 and 41 in a multivibrator circuit is to make the system free-running so that it will continue to function if the external synchronization pulses should fail. Ordinarily, however, the multivibrator is triggered by synchronizing pulses which are supplied to the grid 43 of the tube 40 by the synchronization circuit 21, Fig. 1. The arrival of a synchronizing pulse at the grid 43 renders the tube 40 momentarily conductive. When the tube 40 ceases to conduct, a sawtooth voltage pulse commences to build up across the plates of a condenser 44. The condenser 44 is charged through a vertical size control resistor 45 by the source of plate supply voltage for the tube 40. The sawtooth voltage pulse is applied through a coupling capacitor 46 to the grid 47 of the second tube 41. The feedback connection for multivibrator action is effected from the plate 48 of the tube 41 through a capacitor 49, resistor 50, and capacitor 51 to the grid 43 of the switch tube 40.

The tubes 41 and 42 operate in push-pull for supplying deflecting voltages in opposite phases to the vertical deflecting plates 36 of the picture tube 35. An amplified sawtooth voltage wave appears at the plate 48 of the tube 41 and is applied through a capacitor 54 to one of the plates 36. The other deflecting plate 36 is coupled through a capacitor 55 to the plate 56 of the output tube 42. The amplified sawtooth voltage wave at the plate 48 of the tube 41 also is applied across the voltage divider formed by capacitors 49 and 61. The voltage across capacitor 61 is applied through resistor 59 to the grid 60 of the tube 42. The voltage divider provides the required voltage at the grid 60 so that a voltage having the same amplitude and opposite polarity to that on the plate 48 appears at the plate 56 of the tube 42. The sawtooth wave furnished by the tube 41 also is differentiated in a differentiating circuit that includes the capacitor 49 and the resistor 58 to provide sharp pulse components on the sawtooth wave which is sent back through the resistor 50 and the capacitor 51 to the grid 43 of the tube 40. These sharp pulses cause the tube 40 to conduct rapidly at periodic intervals for short-circuiting the condenser 44, which discharges through the tube 40 and thereby produces the steep sides of the sawtooth wave. The natural period of the multivibrator 40—41 when free-running is slightly longer than the period of the external synchronizing pulses, so that the multivibrator actually is triggered by the external pulses. The plates of the tubes 40 and 42 are connected together through a resistor 63, which provides a certain amount of feedback from the plate 56 to the capacitor 44. This modifies the sawtooth voltage wave developed by the capacitor 44 by increasing the low-frequency components thereof to compensate for low-frequency distortion in the system, so that the vertical sweep is absolutely linear.

The picture tube 35 has a cathode 64 to which the picture signal pulses are supplied from the video amplifier. The cathode 64 is connected to a brightness control potentiometer 65, the opposite ends of which are connected respectively to ground and to a source of positive voltage. The setting of the potentiometer 65 determines the steady potential of the cathode 64 with respect to ground and thereby determines the brightness of the picture.

The picture tube 35 also has a first grid 66 that ordinarily would be grounded. In the present case, however, the grid 66 is connected to the junction of a capacitor 68 and a resistor 69 that together constitute a differentiating circuit which is connected across the plate 56 and the cathode 70 of the output tube 42. This circuit differentiates the sawtooth voltage wave in the output of the tube 42, producing sharp negative pulses 71 across the peaking resistor 69. Inasmuch as the picture tube grid 66 is connected to ground through the peaking resistor 69, these differentiated pulses 71 periodically drive the grid 66 negative with respect to ground. This occurs at times when the tracing beam of the picture tube 35 is being returned vertically. The intensity of the beam is greatly reduced when a pulse 71 is impressed upon the grid 66, and this prevents any vertical retrace lines from appearing on the screen of the tube 35. Hence, even though the vertical blanking pulses in the received video signal are very weak, the picture tube 35 is prevented from displaying any vertical retrace lines.

Figure 3:
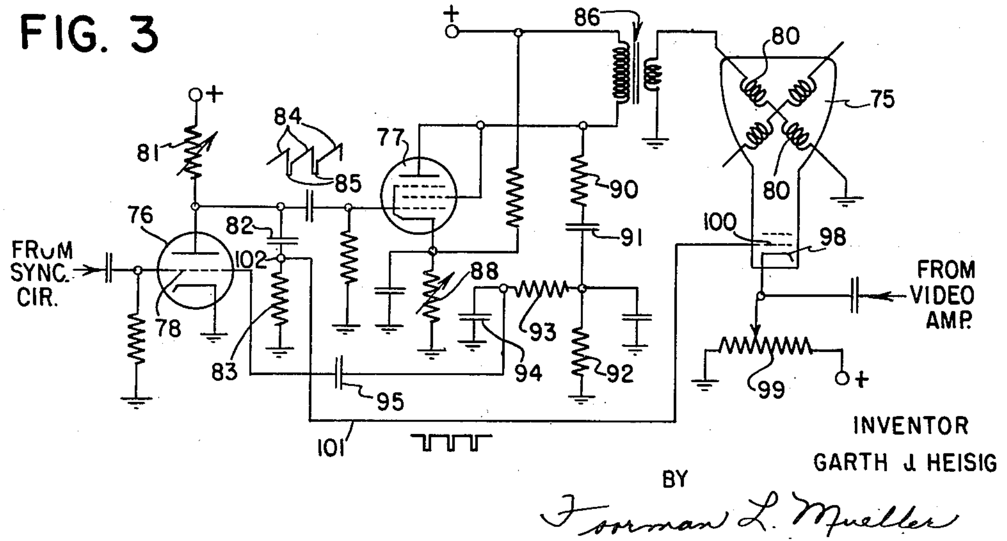
Fig. 3 is a schematic view showing the application of the invention to a vertical sweep system for a picture tube of the electromagnetic type.

Fig. 3 illustrates an electromagnetic picture tube 75 and its associated vertical sweep system. A switch tube 76 and an output tube 77 are arranged in a free-running multivibrator circuit which has a natural period slightly longer than the period of the synchronizing pulses applied externally to the grid 78 of the tube 76. The voltage wave generated by the sweep system is shaped so that it will produce a sawtooth current wave in the vertical deflecting coils 80 associated with the picture tube 75. To accomplish this, voltage is applied from a source of positive potential through a vertical size control resistor 81 to the series combination of a capacitor 82 and a resistor 83. The capacitor 82 and resistor 83 are connected across the switch tube 76, which is periodically rendered conductive to discharge the capacitor 82 through the resistor 83 and the tube 76. The output voltage wave which appears across the capacitor 82 and resistor 83 consists of positive-going sawtooth pulses 84 separated by negative-going pips 85. The capacitor 82 and resistor 83 therefore form a wave shaping circuit across which a voltage wave of trapezoidal wave form is produced. This complex voltage wave is amplified by the output tube 77 and is applied through a transformer 86 to the vertical deflecting coils 80 of the picture tube 75. A variable resistor 88 in series with the output tube 77 controls the vertical linearity. With this resistor properly adjusted, a linear sawtooth current wave passes through the deflecting coils 80.

A part of the output of the tube 77 passes through a voltage divider network including the resistor 90, capacitor 91 and resistor 92, and a feedback coupling is made from this divider network through a low-pass filter, comprising a resistor 93 and capacitor 94, and thence through a blocking capacitor 95 to the grid 78 of the switch tube 76. This feedback coupling provides the desired multivibrator action. The inductive "kick" of the deflection circuit is utilized to furnish triggering pulses through said coupling to the tube 76.

The cathode 98 of the picture tube 75 is biased positively through the medium of a brightness control potentiometer 99, the opposite terminals of which are connected respectively to ground and to a source of positive potential. The picture signals from the video amplifier are injected into the cathode 98 to produce the image on the screen of the tube 75.

The picture tube 75 has a first grid 100 that ordinarily would be connected to ground. In order that this grid may serve the function of suppressing vertical retrace lines in the picture tube 75, it is merely necessary to connect the grid 100 by a conductor 101 to the junction 102 of the capacitor 82 and the resistor 83. This interposes the voltage drop in the resistor 83 between the grid 100 and ground. The resistor 83 has a peaking effect which assists in shaping the output voltage wave 84 by adding the negative-going pips 85 thereto as explained above. The sharp negative pulses developed in the resistor 83 are, in the present instance, applied through the conductor 101 to the grid 100 of the picture tube 75 for periodically decreasing the intensity of the tracing beam in synchronism with the vertical return movements thereof. Thus, any vertical retrace lines which otherwise might appear on the screen of the picture tube 75 are effectively blanked.

From the foregoing description it is apparent that the invention greatly improves the performance of television receivers by eliminating the vertical retrace lines under conditions when the vertical blanking pulses in the received video signals are weak. The means whereby this is accomplished is simple and economical. In the case of the electromagnetic system shown in Fig. 3, the only change required is to disconnect the grid 100 from ground and connect it to the peaking portion of an RC wave shaping circuit 82—83 that already exists in the system. In the case of the electrostatic system shownin Fig. 2, the only change required is to add the differentiating circuit 68—69 and connect the grid 66 to ground through the peaking resistor 69, instead of connecting this grid directly to ground as done heretofore.

It is important to note, that these changes, though slight, add a new and important function to the first grid of the picture tube and also to the vertical sweep system, namely, that of suppressing vertical retrace lines.

While the invention has been described with reference to several preferred embodiments thereof, it is recognized that modifications of such embodiments are possible without departing from the spirit and scope of the invention as expressed in the appended claims.

I claim:

1. In a television receiver which includes a picture tube having means for providing an electron beam which impinges on a screen, which tube includes cathode electrode means connected to a source of video signals and grid electrode means for controlling the intensity of the beam in accordance with the potential applied thereto, and which receiver includes vertical deflection coils for producing vertical trace and retrace of the beam across the screen; a vertical sweep system for providing a sawtooth current wave for the vertical deflection coils and for providing a pulse voltage wave for blanking the picture tube beam during the vertical retrace thereof including in combination, voltage generating means having a wave shaping circuit across which a voltage wave of trapezoidal form is produced, said wave shaping circuit including a condenser portion and a resistor portion connected in series, with one end of said resistor portion being held at a reference potential, charging means for providing current through said wave shaping circuit for charging said condenser portion to produce the trace portion of said trapezoidal voltage wave, said charging means including a source of positive potential and an impedance element connecting said source to said series wave shaping circuit, and electron tube switch means for providing a low impedance bridge across said wave shaping circuit whereby said condenser portion discharges through said resistor portion to produce the retrace portion of said trapezoidal wave, the discharge of said condenser portion providing current flow through said resistor portion to produce a negative voltage pulse thereacross, amplifier means having an input connected to said wave shaping circuit and an output connected to the vertical deflection coils for producing a sawtooth current wave in the deflection coils in response to said trapezoidal wave developed across said wave shaping means, and a direct wire connection between said resistor portion of said wave shaping circuit and the grid electrode means of the picture tube for applying at least a portion of said negative voltage pulse developed across said resistor portion to the grid electrode means for blanking the electron beam of the tube as said condenser portion discharges to thereby blank the beam during the vertical retrace thereof.

2. In a television receiver which includes a picture tube having means for providing an electron beam which impinges on a screen, which tube includes cathode electrode means connected to a source of video signals and grid electrode means for controlling the intensity of the beam in accordance with the potential applied thereto, and which receiver includes vertical deflection coils for producing vertical trace and retrace of the beam across the screen; a vertical sweep system for providing a sawtooth current wave for the vertical deflection coils and for providing a pulse voltage wave for blanking the picture tube beam during the vertical retrace thereof including in combination, voltage generating means having a wave shaping circuit across which a voltage wave of trapezoidal form is produced, said wave shaping circuit including a condenser portion and a resistor portion connected in series, with one end of said resistor portion being held at a reference potential, charging means for providing current through said wave shaping circuit for charging said condenser portion to produce the trace portion of said trapezoidal voltage wave, said charging means including a source of positive potential and variable resistance means connecting said source to said series wave shaping circuit, and electron tube switch means providing a low impedance bridge across said wave shaping circuit when said tube switch means is conductive, whereby said condenser portion discharges through said resistor portion to produce the retrace portion of said trapezoidal wave, the discharge of said condenser portion providing current flow through said resistor portion to produce a negative voltage pulse thereacross, amplifier means having an input connected to said wave shaping circuit and an output connected to the vertical deflection coils for producing a sawtooth current wave in the deflection coils in response to said trapezoidal wave developed across said wave shaping means, and a direct connection between said resistor portion of said wave shaping circuit and the grid electrode means of the picture tube consisting of a wire conductor, said wire conductor applying at least a portion of said negative voltage pulse developed across said resistor portion to the grid electrode means for blanking the electron beam of the tube as said condenser portion discharges to thereby blank the beam during the vertical retrace thereof.

GARTH J. HEISIG.

REFERENCES CITED

The following references are of record in the file of this patent:

UNITED STATES PATENTS

| Number | Name | Date |
|---|---|---|
| 2,202,612 | Urtel | May 28, 1940 |
| 2,215,285 | Ballard | Sept. 17, 1940 |
| 2,235,053 | Urtel | Mar. 18, 1941 |
| 2,261,776 | Poch | Nov. 4, 1941 |
| 2,265,780 | Schlesinger | Dec. 9, 1941 |
| 2,285,043 | Messner | June 2, 1942 |
| 2,432,173 | Rhea | Dec. 9, 1947 |

FOREIGN PATENTS

| Number | Country | Date |
|---|---|---|
| 417,590 | Great Britain | Oct. 2, 1934 |
| 526,111 | Great Britain | Sept. 11, 1940 |
| 807,814 | France | Jan. 22, 1937 |
| 845,897 | France | Sept. 4, 1939 |
| 846,431 | France | Sept. 18, 1939 |